United States Patent Office

2,974,108
Patented Mar. 7, 1961

2,974,108

ALUMINOSILICATE AQUASOLS AND THEIR PREPARATION

Guy B. Alexander, Brandywine Hundred, Del., assignor to E. I. du Pont de Nemours and Company, Wilmington, Del., a corporation of Delaware No Drawing. Filed Jan. 14, 1957, Ser. No. 633,832

10 Claims. (Cl. 252—313)

This invention relates to aquasols and processes for making them, and is more particularly directed to aquasols comprising negatively charged particles consisting throughout of aluminosilicate having the empirical formula $MAl_2.XAl_2O_3.YSiO_2$, where X ranges from 0 to 25, Y ranges from 1 to 200, and M is a monovalent cation selected from the group consisting of elements of group 1A of the periodic table, ammonium, and substituted ammonium ions, and the Si:Al mol ratio is from 1:1 to 50:1, said particles being amorphous, substantially spheroidal in shape, and ranging in size from 3 to 150 millimicrons; and is further particularly directed to the step in a process for making such sols, comprising adding an aqueous solution of "active silica" and an aqueous solution of an alkali metal aluminate simultaneously and separately to an aqueous medium containing an amount of alkali sufficient to maintain the pH in the range of from 8 to 12.

Silica aquasols containing negatively charged particles which are substantially discrete units of dense amorphous silica are common in the art. Typical of these are the sols described in Bechtold and Snyder U.S. Patent 2,574,902 and in Rule U.S. Patent 2,577,485. Other disclosures of silica sols can be found in Alexander U.S. Patent 2,750,345, Marshall U.S. Patent 2,515,960, White U.S. Patent 2,285,477 or Trail U.S. Patent 2,573,743. In the sols of all of these patents the particles are composed of substantially pure silica. In most cases, the particles are composed of dense materials, however, the particles do not have any appreciable ion-exchange characteristics.

The present invention provides a means for preparing colloidal aluminosilicate particles which have ion-exchange character. Actually, the ion-exchange capacity of the compositions of this application, expressed as milliequivalents per gram is essentially equivalent to that of the better zeolites, and also about equivalent to the ion-exchange capacity of the synthetic organic ion-exchange resins. One advantage of the present invention is that it provides an inorganic ion-exchange agent. A further advantage is that it provides an inorganic ion-exchange solid material in the colloidal or dispersed form. Because of the inorganic nature of the ion-exchange material, it can be used at relatively elevated temperatures and in solutions which would corrode or disintegrate organic ion-exchange resins. Because of the colloidal form of the ion-exchange material, it is useful, for example, in solutions where the presence of dense, rapidly settling solids would be objectionable.

According to the present invention it has been found that novel aquasols of colloidal aluminosilicate particles having ion-exchange properties can be prepared by adding an aqueous solution of "active silica" and an aqueous solution of alkali metal aluminate, such as sodium aluminate, simultaneously but separately to a body of aqueous alkali solution having a pH of 8 to 12.

The term "active silica" is already well known in the art, and has been defined, for instance, in U.S. Patent 2,731,326, issued January 17, 1956, to G. B. Alexander et al., see column 5, line 66, to column 7, line 35. "Active silica" solutions can be prepared, for example, from sodium silicate solutions, by passing them through a cation-exchange resin in the hydrogen form, the reaction being conducted at room temperature, and according to U.S. Patent 2,244,325 to Bird. More specifically, an "active silica" solution is prepared by diluting a sodium silicate solution having an $SiO_2:Na_2O$ mol ratio of 3.3:1, with water until the silica weight concentration in the sodium silicate is of the order of 1 to 3 percent, and thereafter passing this diluted sodium silicate solution through a column of cation-exchange resin in the hydrogen form, as, for example, "Nalcite" HCH resin in the hydrogen form.

The alkali metal aluminates used in the processes of this invention must be water-soluble. Sodium or potassium aluminates are commercially available, and either may be used. In preparing a solution of the aluminate, it is sometimes desirable to add excess alkali, such as sodium hydroxide, potassium hydroxide or lithium hydroxide, in order to decrease the extent of hydrolysis of the aluminate. Moreover, it is preferred that the solution should be used soon after preparation.

In the event that an alkali metal aluminate is used in which the M:Al ratio is greater than 1:1 (as in the case of using excess NaOH in preparing a solution of $NaAlO_2$), then the product will contain an excess of alkali metal ion over the amount required for the composition $MAlO_2.YSiO_2$. This excess alkali metal ion can be removed, if desired, as hereinafter described. In some instances it may be desirable to leave the excess alkali metal hydroxide in the product; such products are useful and are a part of this invention.

One process for preparing the products of this invention is to add simultaneously, but separately, solutions of active silica and sodium aluminate to a heel of dilute sodium hydroxide, having a pH in the range of from 8 to 12. The reaction can be conducted at ordinary temperature, but it is preferred to conduct it at a temperature in the range of about 100° C. and even temperatures in excess of this can be used, provided pressure is applied to present excessive evaporation from the sol during preparation. A convenient temperature range is from 80 to 100° C.

During the reaction, it is preferred that the pH of the mixture be maintained on the alkaline side, and more preferably in the range of 9 to 12. During the addition of the active silica and aluminate solutions, vigorous agitation particularly at the point of admitting these solutions into the reaction mixtures, should be maintained. Thus, it is preferred to avoid any substantial concentrations of either of these reactants in the reaction mixture.

The rate of addition of silicate and aluminate should preferably be adjusted so that during any given preparation, the relative amount of these materials which are added per unit of time is substantially constant. Ordinarily, the reactants will be added to the reaction mixture over a period of several hours, a reaction time of from 6 to 12 hours being usually sufficient to achieve the desired particle size.

Soluble electrolytes, such as sodium chloride, lithium carbonate, or potassium nitrate, tend to coagulate the aluminosilicate sol particles. For this reason, the heel and feed solutions should be essentially free of extraneous electrolytes such as those indicated. Salts liberating polyvalent cations should specifically be avoided.

The size of the colloidal particles which are obtained in processes of this invention can be regulated by regulating the temperature. Thus, at relatively low temperatures, smaller particles are obtained; on the other hand, at higher temperatures, larger particles result. Moreover, the time used in the process influences the particle size, smaller particles being prepared when the addition of active silica and aluminate is rapid, and larger particles resulting when the addition is over a longer period of time. If one wishes to obtain extremely large particles of aluminosilicate, one can use as a heel in the reaction a previously prepared aluminosilicate sol and grow the particles in this sol by an accretion process by adding active silica and soluble aluminate thereto.

Either simultaneously with the preparation of the colloidal particles or afterward, the pH of the solution can be adjusted as desired, as, for example, by adding acid or ion-exchange resin in the hydrogen form. Alternatively, one can pass these solutions through a cation-exchange resin in the ammonium form, and thus obtain products in which essentially all of the monovalent alkali metal cation used in the alkali metal aluminate solution during preparation is replaced by ammonium or substituted ammonium ions.

Because of the instability, or tendency to polymerize, of sodium aluminate solutions, it is advantageous to use these solutions immediately after their preparation, and in certain instances to add excess soluble alkali metal hydroxide, such as sodium hydroxide, to the sodium aluminate feed solution in order to prevent this prepolymerization of alumina. In these instances, the resulting sodium aluminosilicate sol will have a relatively high pH, as, for example, in or above the pH range of 11 to 12. In these cases, it is most desirable to lower the pH of the resulting sol products by deionization, dialysis, or neutralization with acid, the most preferred way being accomplished by the use of cation-exchange resin in the hydrogen form. Deionization can be conducted to a pH as low as desired, as, for example, in the pH range of from 5 to 7, as hereinafter discussed.

The degree to which sols of this invention can be concentrated depends, in part, on the nature of the colloidal particles. In most instances, where the particles consist essentially of $MAlO_2:YSiO_2$, the particles will be porous, and have a relatively low density. With such particles, it is possible to concentrate the sols only to the range of 10 to 20 percent, if one wishes to obtain a stable product which will not change in viscosity on aging. On the other hand, if there is a smaller amount of aluminum present in the 4-fold coordination as aluminate in the particles and a higher percentage of the aluminum is in the 6-fold coordination state, the particles can be more dense, and then it is possible to increase the final sol concentration which can be obtained.

Particle size also affects the concentration which can be obtained. Thus, products in the particle size range of from 50 to 100 m$\mu$ can be concentrated to a much higher solids content than sols in the lower, say 10 m$\mu$, particle size range. For instance, products containing dense particles of about 50 to 100 m$\mu$ can be concentrated to about 70 percent solids.

Concentration of the sols can be effected by evaporating off water by any of the processes with which the art is familiar. It can be effected simultaneously with the polymerization and growth processes. Alternatively, the particles can be polymerized, and the resulting sol can then be deionized to remove excess electrolytes, and finally concentrated to the desired degree.

The products of this invention are stable, colloidal aquasols. The solid phase of these aquasols comprises aluminosilicate, having the following empirical formula: $MAlO_2 \cdot XAl_2O_3 \cdot YSiO_2$, where X is in the range from 0 to 25, and Y is in the range from 1 to 200, and M is a monovalent cation, selected from the group 1A of the periodic table, ammonium, and substituted ammonium ions. In the preferred products, X is a relatively small number, and in the range of from 0 to 1, and Y is in the range from 5 to 20.

Included as novel sols are sols containing particles in which a part of the monovalent cation has been exchanged for hydrogen ion. However, it is preferred that not more than ½ of this monovalent cation is hydrogen. Most preferably, M is lithium, sodium, ammonium or tetramethylammonium.

The particles in the sols are amorphous, substantially spheroidal in shape, and have particle sizes in the range of from 3 to 150 millimicrons, preferably in the range of from 10 to 50 millimicrons. The sols may contain from 3 to 70 percent solids, preferred products containing more than 10 percent solids. The sols are stable, that is, their viscosity does not increase substantially when stored at ordinary temperatures (20 to 35° C.) over a six-month period. Broadly, the sols may have a pH in the range of from 4 to 12, but the preferred pH range for maximum stability in storage is from 6 to 10.

A preferred specie of compositions of this invention is a stable colloidal aquasol containing amorphous, spheroidal particles of aluminosilicate in the size range of from 10 to 50 millimicrons, in which Y is in the range from 5 to 20 (not necessarily a whole number), and the aquasol contains from 5 to 20 percent solids, and has a pH in the range of 5 to 10 and a porosity of 10 to 70 percent. The porosity can be determined from the negative absorption of anions in the sol.

When aluminate is combined with "active silica" in alkaline solutions, there is a tendency for aluminum to substitute for silicon in the lattice structure. This results in a charge defect because of the difference in valence of aluminum and silicon. The resulting negative charge is offset by the presence of cations which serve to preserve electrolyte neutrality. These cations are usually highly hydrated and consequently a considerable amount of water is thereby occluded in the particles. This, it is believed, accounts for the porous nature of said aluminosilicate particles.

The compositions of this invention can be characterized by their chemical analysis, ion-exchange capacity, appearance under the electron microscope, and viscosity and changes in viscosity with time.

The chemical composition of the sol particles can be determined by analytical techniques conventional in the art. Broadly, the particles comprise chemically combined silicon, aluminum, hydrogen, oxygen, and a monovalent cation, the monovalent cation being selected from group 1A of the periodic table, ammonium, substituted ammonium such as tetramethylammonium, and hydrogen ions. The empirical formula of the particles can be expressed as $MAlO_2 \cdot XAl_2O_3 \cdot YSiO_2$. The total ratio of Al:Si should not exceed 1, i.e., Y should be greater than X+1. The more preferred products are those in which the greater proportion of the alumina is in the 4-fold coordination state expressed a $MAlO_2$—that is, in which X has a relatively small value, including zero. In these products, there is essentially no aluminum in the 6-fold coordination state, and the empirical formula is:

$$MAlO_2 \cdot YSiO_2$$

Y being in the range from 5 to 20.

Before running a chemical analysis to determine composition as above-outlined, any excess alkali preferably should be removed, i.e., the sol should be adjusted to pH 7. Also, the sol should be essentially free of soluble electrolyte. The pH can be adjusted in the case of sols having an alkaline pH—that is, the pH can be lowered to 7 by deionizing with a cation-exchange resin in the hydrogen form, as by stirring small amounts of resin with the sol until the pH drops to 7. Sols having a pH below 7 can be analyzed without pH adjustment. Soluble electrolytes, such as sodium chloride or potassium sulfate, can be removed by dialysis.

The ratio of aluminum in 4-fold coordination, $MAlO_2$, to the aluminum in the 6-fold coordination state, 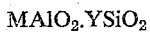, can be determined from chemical analysis. To do this, it is most convenient to replace any exchangeable ions in the particles with sodium ions, remove foreign electrolyte, adjust the sol to pH 7, and analyze the system for total sodium and alumina. Each aluminum in the 4-fold coordination will be accompanied by a sodium. Any excess of aluminum is in 6-fold coordination. From chemical analysis determined in this manner one can calculate the ratio of $MAlO_2$ to $Al_2O_3$.

The ion-exchange capacity of the particles in the novel aluminosilicate sols is equal to the amount of aluminum present in the 4-fold coordination state. One way of measuring the ion-exchange capacity is to saturate the particles in the sol with a specific cation, remove the excess of foreign salts, and analyze the solid phase for the ion in question. From pH titration curves, it can be shown that, although hydrogen ion is preferentially adsorbed over sodium, an irreversible conversion of 4-fold to 6-fold coordination of alumina occurs if more than about 50 percent of the cations present in the structure is in the hydrogen form. As the ratio of $MAlO_2:SiO_2$ is increased, the percentage of M, which may be replaced by hydrogen ion before this switch in coordination occurs, is decreased.

The sol which is in the sodium aluminosilicate form can be converted to other forms by reaction with an ion-exchange resin containing the appropriate cations. For example, sodium aluminosilicate sols can be converted to lithium aluminosilicate sols by treating the sol with cation-exchange resin, as, for example, "Nalcite" HCR in the lithium form. "Nalcite" HCR is an organic, sulfonic acid type, cation-exchange resin. Alternatively, the sol can be converted from the sodium to lithium form by treatment with lithium salt solution, such as lithium chloride. However, the salt coagulates the particles of the colloid if its concentration exceeds about 0.05 normal; therefore, it is preferred to keep the concentration of the salt solution below about this value. Sols of this invention can also be converted partially to the hydrogen form by treatment with acid or with ion-exchange resin in the hydrogen form.

Using the electron microscope, one can determine the size and shape of colloidal particles in the novel sols. The particles are amorphous aluminosilicate, and the amorphous nature can be readily observed by viewing the particles with the electron microscope. This is ordinarily done by diluting the sol with water prior to examination. Dilutions are usually of the order of less than 0.1%. The particles are seen to be spheroidal in shape. The amorphous nature of the particles can be confirmed by examination with electron diffraction; by this method no evidence is found of any significant amount of crystalline material.

The particle size of the colloidal particles can be readily determined by counting techniques involving the electron micrograph. Thus, by using a 50,000 × magnification, it is possible to determine that the products of this invention contain colloidal particles in the size range of from 3 to 150 millimicrons.

The relative viscosity of the sols can readily be determined, using an Ostwald pipette. The relative viscosity, $N_r$, is calculated from the following expression:

$$N_r = \frac{dt}{d_w t_w}$$

where $d$ and $t$ are the density and drain time of the sol being investigated, and $d_w$ and $t_w$ are the density and drain time of water, respectively.

The percent aluminosilicate in the dispersed phase is then calculated, using the relationships developed by Mooney:

$$\log_e \frac{n}{n_0} = \frac{2.5c}{1-1.43c} \quad \text{(Note: } N_r = n/n_0\text{)}$$

where $c$ is the fraction of the total volume of the dispersion which is occupied by the viscosity creating dispersed phase. (See Journal of Colloid Science, 6: 162–170 (1951).) The relationship of relative viscosity to $c$ can be obtained from Figure 4. From this value of $c$, one can calculate the percent aluminosilicate by weight in the dispersed phase, using the relationship:

$$S = \frac{A}{c(1-0.00566A)+0.00566A}$$

where $S$ is the percent aluminosilicate by weight in the dispersed phase, and $A$ is the percent aluminosilicate by weight in the sol.

In the preferred products, the ultimate particles are discrete or unaggregated, as can be shown by electron micrographs after the solution has been diluted. Thus, in a preferred product containing particles comprising $NaAlO_2 \cdot 10SiO_2$, the particles will be porous to the extent that about 50 percent of their volume will be the liquid phase of the sol. This is a result of the monovalent cation, sodium, which is included in the structure. In some instances, the colloidal particles may contain as little as 30 percent solids within their structure, the remaining 70 percent of the pores being filled with water or the liquid medium in which the particles are suspended.

The invention can be better understood by reference to the following illustrative examples:

*Example 1*

A sodium aluminosilicate sol was prepared in the following manner: A 1500 ml. portion of 0.01 normal sodium hydroxide was heated to 95° C. To this heel, simultaneously and separately, there was added two feed solutions. These two feed solutions comprised: (a) 1200 ml. of 2% silicic acid solution. This was prepared from "F" grade sodium silicate, which contained 28.6% $SiO_2$ and had an $SiO_2:Na_2O$ mol ratio of 3.3:1. This "F" grade sodium silicate was diluted with water to 2% $SiO_2$ content, then passed through a column of "Nalcite" HCR cation-exchange resin in the hydrogen form. The resulting silicic acid effluent contained 2% $SiO_2$ and had a pH of about 3. (b) 1200 ml. of a sodium aluminate solution. This was prepared by dissolving 4.4 g. of $NaAlO_2$ (75% reagent) and 5 g. of NaOH in water and diluting to the required volume. During the addition of these two feed solutions, which were added at the rate of 200 mls. each per hour, the temperature was maintained in the range of 90–95° C. After the completion of this reaction, the resulting colloidal sol was cooled, deionized with "Nalcite" HCR in the hydrogen form by stirring this resin with the sol until the pH reached 7.5. The sol was then concentrated to a volume of about 1 liter, deionized (using "Nalcite" HCR resin in the hydrogen form) to pH 7.5, and finally concentrated to about 270 grams.

The resulting product was a stable, sodium aluminosilicate sol containing 9.7% solids. Chemical analysis of the resulting sol indicated that it contained 8.5% $SiO_2$, 0.74% $Al_2O_3$, and 0.47% $Na_2O$. Thus, the resulting product was an aluminosilicate sol having the empirical formula of about: $NaAlO_2 \cdot 10SiO_2$. When measured in an Ostwald pipette, the sol had a relative viscosity of 1.71, which calculates to a percent solids of 48%, using the Mooney equation as described in the J. Colloid Sci., 6: 162–170 (1951). At 5% solids, the relative viscosity of the sol was 1.3.

The stability of the sol was characterized by the concentration of sodium chloride solution necessary to cause gelation or flocculation. When the sol was diluted to 7% solids, it was stable for at least 14 days, and also was stable at a sodium chloride concentration smaller than 0.02 normal at pH 5, in salt solutions of 0.01 normal at pH 7, or at 0.05 normal sodium chloride solution, when the pH was 9. At lower concentrations, the stability of the sol was markedly increased in the presence of sodium chloride.

From a study of the pH titration curves of the sol, it was concluded that the sol was chemically stable if the percentage exchangeable hydrogen ion does not exceed 40%, corresponding to a pH of 3.5 and 0.01 normal sodium chloride solution, a pH of 3 and 0.1 normal sodium chloride, or a pH of 2.5 and 1.0 normal sodium chloride solution. The titration curves also revealed that the hydrogen ions are preferentially absorbed over sodium ions by a factor of about 40, and that this particular sol has an ion-exchange capacity of about 1.5 milliequivalents per gram of solid in the sol.

*Example 2*

A sodium aluminosilicate sol was prepared in the following manner: A heel of 1.5 liters of water was heated to reflux and there was added thereafter two feed solutions: (a) 1200 ml. of 2% silicic acid prepared as in Example 1, and (b) 1200 ml. of sodium aluminate which was prepared by dissolving 42 grams of sodium aluminate in distilled water and diluting to volume. These feeds were added over a period of 6 hours while maintaining the temperature at 90 to 95° C. The reaction was run in a creased flask with vigorous agitation, and with the two feed solutions being admitted to the reaction solution through capillaries which were placed very near a stirrer which was agitated at a vigorous rate.

The sodium aluminosilicate sol was then deionized to pH 6.9, and concentrated by direct boil-down to 640 grams, whereupon the pH rose to 9.1. The pH was further reduced to 7.0 by treatment with "Nalcite" HCR resin in the hydrogen form, and the sol further concentrated to 300 g. The final product contained 8.42% $SiO_2$, 3.92% $Al_2O_3$, and 1.24% $Na_2O$. This corresponds to an empirical formula of $NaAlO_2 \cdot 0.45Al_2O_3 \cdot 3.5SiO_2$. An electron diffraction study of the product showed that there was no significant amount of crystalline material present in the solids of this product.

An electron micrograph of the product showed that the particles were about 20 millimicrons in size, spherical in shape, and essentially non-aggregated.

This material was tested as an antisoil agent by painting a sample on wallpaper. It was noted that the treated wallpaper had extremely good antisoiling properties.

*Example 3*

By using part of the dilute sol obtained in Example 2 as heel, heating, and thereafter adding feed solutions to this sol as indicated in Example 2, particles of 50 millimicrons in diameter were prepared by a further growth process. Even larger particles could be prepared by further continuing the growth process.

*Example 4*

This example relates to the preparation of a lithium aluminosilicate solution in which a lithium aluminate was used in place of sodium aluminate. Otherwise, the example was run according to the directions in Example 1. Lithium aluminate was prepared by passing a sodium aluminate solution through a column of "Nalcite" HCR resin in the lithium form. The final product was a stable colloidal sol containing 6.21% $SiO_2$, 0.5% $Al_2O_3$, and 0.17% $Li_2O$. This corresponds to a lithium aluminosilicate having approximately the following empirical formula: $LiAlO_2 \cdot 10SiO_2$.

*Example 5*

This example relates to the preparation of a potassium aluminosilicate in which the preparation was made similarly to Example 1, except that potassium aluminate was used in place of sodium aluminate in the feed solution. The resulting stable colloidal sol contained particles having the empirical formula: $KAlO_2 \cdot 15SiO_2$.

*Example 6*

This example relates to a product of this invention which is an ammonium aluminosilicate. This ammonium aluminosiliacte was prepared by passing the sodium aluminosilicate of Example 1 through a column of "Nalcite" HCR cation-exchange resin in the ammonium form.

*Example 7*

A colloidal sol having particles which had an ion-exchange capacity of 2 milliequivalents per gram of solids was prepared by the technique of Example 1, except that the aluminate feed solution contained 7.2 g. of 75% $NaAlO_2$ and 5 g. NaOH. The final sol had the following analysis: 6.60% $SiO_2$, 0.94% $Al_2O_3$, 0.59% $Na_2O$, 7.67 pH and 1.23 relative viscosity when diluted to 5% solids content.

I claim:

1. An aquasol having a pH of about 4 to 10, the sol consisting essentially of (a) water as the continuous phase, and (b) a dispersed solid phase of negatively charged particles, the solid in said particles consisting throughout of an aluminosilicate having the empirical formula $MAlO_2 \cdot XAl_2O_3 \cdot YSiO_2$, where X ranges from 0 to 25, Y ranges from 1 to 200, and M is a monovalent cation selected from the group consisting of elements of group 1A of the periodic table, ammonium, and substituted ammonium ions, and the Si:Al mol ratio is from 1:1 to 50:1, said particles being amorphous, substantially spheroidal in shape, and ranging in size from 3 to 150 millimicrons in diameter, and being present in a concentration of from 3 to 70% by weight in the sol, the soluble salt content of the aquasol being not substantially greater than 0.05 Normal, and the aquasol being stable against any substantial increase in viscosity when stored at 20 to 35° C. for six months.

2. An aquasol having a pH of about 4 to 10, the sol consisting essentially of (a) water as the continuous phase, and (b) a dispersed solid phase of negatively charged particles, the solid in said particles consisting throughout of an aluminosilicate having the empirical formula $MalO_2 \cdot XAl_2O_3 \cdot YSiO_2$, where X ranges from 0 to 1, Y ranges from 5 to 20, and M is a monovalent cation selected from the group consisting of elements of group 1A of the periodic table, ammonium, and substituted ammonium ions, and the Si:Al mol ratio is from 1:1 to 50:1, said particles being amorphous, substantially spheroidal in shape, and ranging in size from 10 to 150 millimicrons in diameter, and being present in a concentration of from 3 to 70% by weight in the sol, the soluble salt content of the aquasol being not substantially greater than 0.05 Normal, and the aquasol being stable against any substantial increase in viscosity when stored at 20 to 35° C. for six months.

3. An aquasol having a pH of about 4 to 10, the sol consisting essentially of (a) water as the continuous phase, and (b) a dispersed solid phase of negatively charged particles, the solid in said particles consisting throughout of an aluminosilicate having the empirical formula $NaAlO_2 \cdot XAl_2O_3 \cdot YSiO_2$, where X ranges from 0 to 25, Y ranges from 1 to 200, and the Si:Al mol ratio is from 1:1 to 50:1, said particles being amorphous, substantially spheroidal in shape, and ranging in size from 10 to 150 millimicrons in diameter, and being present in a concentration of from 3 to 70% by weight in the sol, the soluble salt content of the aquasol being not substantially greater than 0.05 Normal, and the aquasol being stable against any substantial increase in viscosity when stored at 20 to 35° C. for six months.

4. An aquasol having a pH of about 4 to 10, the sol consisting essentially of (a) water as the continuous phase, and (b) a dispersed solid phase of nagatively charged particles, the solid in said particles consisting throughout of an aluminosilicate having the empirical formula $LiAlO_2 \cdot XAl_2O_3 \cdot YSiO_2$, where X ranges from 0 to 25, Y ranges from 1 to 200, and the Si:Al mol ratio is from 1:1 to 50:1, said particles being amorphous, substantially spheroidal in shape, and ranging in size from 10 to 150 millimicrons in diameter, and being present in a concentration of from 3 to 70% by weight in the sol, the soluble salt content of the aquasol being not substantially greater than 0.05 Normal, and the aquasol being stable against any substantial increase in viscosity when stored at 20 to 35° C. for six months.

5. An aquasol having a pH of about 4 to 10, the sol consisting essentially of (a) water as the continuous phase, and (b) a dispersed solid phase of negatively charged particles, the solid in said particles consisting throughout of an aluminosilicate having the empirical formula $MAlO_2 \cdot XAl_2O_3 \cdot YSiO_2$, where X ranges from 0 to 25, Y ranges from 1 to 200, and M is a monovalent cation selected from the group consisting of elements of group 1A of the periodic table, ammonium, and substituted ammonium ions, and the Si:Al mol ratio is from 1:1 to 50:1, said particles being amorphous, substantially spheroidal in shape, and ranging in size from 10 to 150 millimicrons in diameter, and being present in a concentration of from 10 to 70 percent by weight in the sol, the soluble salt content of the aquasol being not substantially greater than 0.05 Normal, and the aquasol being stable against any substantial increase in viscosity when stored at 20 to 35° C. for six months.

6. An aquasol having a pH of about 4 to 10, the sol consisting essentially of (a) water as the continuous phase, and (b) a dispersed solid phase of negatively charged particles, the solid in said particles consisting throughout of an aluminosilicate having the empirical formula $NaAlO_2 \cdot XAl_2O_3 \cdot YSiO_2$, where X ranges from 0 to 1, Y ranges from 5 to 20, and the Si:Al mol ratio is from 1:1 to 50:1, said particles being amorphous, substantially spheroidal in shape, and ranging in size from 10 to 150 millimicrons in diameter, and being present in a concentration of from 10 to 70 percent by weight in the sol, the soluble salt content of the aquasol being not substantially greater than 0.05 Normal, and the aquasol being stable against any substantial increase in viscosity when stored at 20 to 35° C. for six months.

7. In a process for producing an aluminosilicate aquasol which is stable against any substantial increase in viscosity when stored at 20 to 35° C. for six months the step comprising adding simultaneously, but as separate solutions, an aqueous solution containing about from 1 to 3% by weight calculated as $SiO_2$, of active silica and an aqueous solution of an alkali metal aluminate to a vigorously agitated body of water having dissolved therein an amount of alkali sufficient to maintain the pH in the range of from 8 to 12, initially, and the proportions of said active silica and aluminate solutions added being such as to maintain the pH in the range of about 9 to 12 during said additions, and the soluble salt contents of the agitated mixture and of the solutions added thereto being low enough that the concentration of salt in the aluminosilicate sol formed is not substantially greater than 0.05 Normal.

8. In a process for producing an aluminosilicate aquasol which is stable against any substantial increase in viscosity when stored at 20 to 35° C. for six months the step comprising adding simultaneously, but as separate solutions an aqueous solution containing about from 1 to 3% by weight calculated as $SiO_2$, of active silica and an aqueous solution of an alkali metal aluminate to a vigorously agitated body of water having dissolved therein, at a temperature of from 80 to 100° C., an amount of alkali sufficient to maintain the pH in the range of from 8 to 12, initially, and the proportions of said active silica and aluminate solutions added being such as to maintain the pH in the range of about 9 to 12 during said additions, and the soluble salt contents of the agitated mixture and of the solutions added thereto being low enough that the concentration of salt in the aluminosilicate sol formed is not substantially greater than 0.05 Normal.

9. In a process for producing an aluminosilicate aquasol which is stable against any substantial increase in viscosity when stored at 20 to 35° C. for six months the step comprising adding simultaneously, but as separate solutions, an aqueous solution containing about from 1 to 3% by weight calculated as $SiO_2$, of active silica and an aqueous solution of sodium aluminate to a vigorously agitated body of water having dissolved therein an amount of sodium hydroxide sufficient to maintain the pH in the range of from 8 to 12, initially, and the proportions of said active silica and aluminate solutions added being such as to maintain the pH in the range of about 9 to 12 during said additions, and the soluble salt contents of the agitated mixture and of the solutions added thereto being low enough that the concentration of salt in the aluminosilicate sol formed is not substantially greater than 0.05 Normal.

10. In a process for producing an aluminosilicate aquasol which is stable against any substantial increase in viscosity when stored at 20 to 35° C. for six months the step comprising adding simultaneously, but as separate solutions, an aqueous solution containing about from 1 to 3% by weight calculated as $SiO_2$, of active silica and an aqueous solution of lithium aluminate to a vigorously agitated body of water having dissolved therein an amount of lithium hydroxide sufficient to maintain the pH in the range of from 8 to 12, initially, and the proportions of said active silica and aluminate solutions added being such as to maintain the pH in the range of about 9 to 12 during said additions, and the soluble salt contents of the agitated mixture and of the solutions added thereto being low enough that the concentration of salt in the aluminosilicate sol formed is not substantially greater than 0.05 Normal.

References Cited in the file of this patent

UNITED STATES PATENTS

| | | |
|---|---|---|
| 1,728,732 | Jaeger | Sept. 17, 1929 |
| 2,455,445 | See et al. | Dec. 7, 1948 |
| 2,787,522 | Lefrancois | Apr. 2, 1957 |

FOREIGN PATENTS

| | | |
|---|---|---|
| 762,717 | Great Britain | Dec. 5, 1956 |

UNITED STATES PATENT OFFICE
CERTIFICATION OF CORRECTION

Patent No. 2,974,108                    March 7, 1961

Guy B. Alexander

It is hereby certified that error appears in the above numbered patent requiring correction and that the said Letters Patent should read as corrected below.

Column 1, line 19, for "$MAl_2.XAl_2O_3.YSiO_2$" read -- $MAlO_2.XAl_2O_3.YSiO_2$ --; column 2, line 13, for "HCH" read -- HCR --; line 42, for "present" read -- prevent --; column 3, line 47, for "dence" read -- dense --; column 4, line 51, for "a" read -- as --; column 8, line 66, for "nagatively" read -- negatively --.

Signed and sealed this 25th day of July 1961.

(SEAL)
Attest:

ERNEST W. SWIDER                        DAVID L. LADD
Attesting Officer                          Commissioner of Patents